Figure 1:
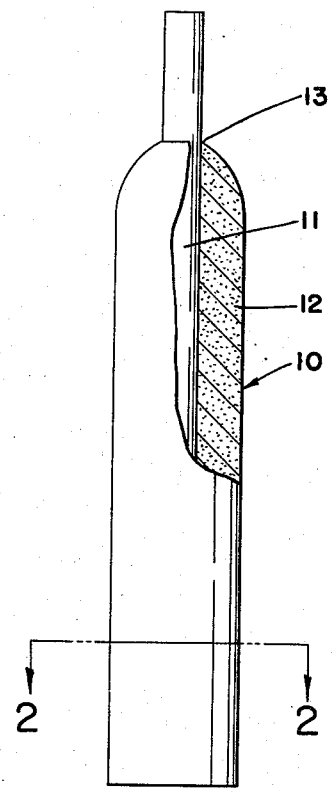

Feb. 25, 1958 R. C. SHUTT 2,824,817
ARC-WELDING ELECTRODES
Filed July 2, 1954

INVENTOR.
ROBERT C. SHUTT
BY
*Alfred C Body*
ATTORNEY

United States Patent Office 2,824,817
Patented Feb. 25, 1958

2,824,817

ARC-WELDING ELECTRODES

Robert C. Shutt, South Euclid, Ohio, assignor to The Lincoln Electric Company, Cleveland, Ohio, a corporation of Ohio Application July 2, 1954, Serial No. 441,181

11 Claims. (Cl. 117—205)

This invention pertains to the art of electric arc welding and, more particularly, to a coated electrode for use in arc welding.

In the patent to Lincoln et al., No. 2,345,758, dated April 4, 1944, and assigned to the assignee of this application, there is described a coated arc-welding electrode of the type wherein a very substantial portion of the metal to be deposited is contained in the electrode coating. This patent employed the then novel principle of utilizing radiated heat from the arc to melt down additional weld metal in the coating. Extremely high ratios of weld metal deposited to the electric power employed resulted and higher melt-off rates than ever theretofore contemplated were obtained.

The electrode of this patent disclosed a metallic component embedded in the coating of the electrode and electrically insulated from a central metal core. This component was shown as either in the form of a tube or a plurality of relatively fine wires embedded in a slag-forming ingredient. The central core of the electrode only was electrically energized and the arc was maintained between the end of the center core and the workpiece. Radiated heat from the arc served to melt down the metallic components in the coating and they became part of the weld bead. Slag-forming ingredients in the coating formed a protective layer over the molten weld bead.

The principle of this patent; i. e., of providing the coating with substantial amounts of the metal to be deposited and employing the radiated heat from the arc to melt down this metal, has been carried forward in the art by reducing the physical size of the metallic components in the coating beyond that specifically described in the said patent by reducing the size of the metallic components to a granulated or powder form. These were bound into a generally uniform coating, together with the slag-forming ingredients by a binder. In any event, the operation of the two electrodes was essentially identical.

Electrodes with the finely divided metallic particles in the coating have heretofore had a number of objectionable features, one of which appears to be that wider dispersion of the metal results in a coating which is electrically conductive. While such electrical conductivity may assist the welding procedure, it results in a safety hazard from electric shock to the welding operator when he inserts the electrode in an electrically energized electrode holder. Furthermore, such electrodes might strike an arc through the sides of the coating should the operator accidentally touch the sides of the electrode to the workpiece prior to welding or when welding, for example, in close or cramped quarters. The effect of such accidental striking of the electrodes through the sides of the coating is quite annoying and, in some instances, can be dangerous.

Another difficulty, which may either be coupled with the dangers of an electrically conductive coating or separate therefrom, is the difficulty of restriking an arc with a partially used electrode once the end thereof has cooled. The core wires of electrodes with substantial amounts of iron or metal in the coatings burn back faster than the coating, leaving the coating extending beyond the end of the core wire with a conically shaped crucible. The inside of this crucible including the core wire end was covered by a fused slag-like material which was electrically nonconductive. In order to restrike the arc, the operator had to break off the extending part of the coating so that he could again make physical contact of the end of the core wire with the workpiece.

Another problem has been that of arc blow necessitating the use of A. C. power sources for the welding current rather than D. C. power sources which are generally preferred. Still another problem is that of the slag both during the welding and its removal after the welding. The slags heretofore have been too fluid tending to interfere with the welding operation and too difficult to remove after cooling and hardening.

The present invention contemplates and has for its principal object a coated electrode of the type wherein at least a portion of the deposited weld metal will come from the coating itself, which electrode overcomes the above referred to difficulties and enables high-quality, high-speed welds to be obtained with a minimum of operator skill.

Another object is a coated rod wherein the coating has a large percentage of weld metal therein and is electrically nonconductive but forms a slag which is electrically conductive.

Still another object is the provision of a coated electrode of the type referred to which does not require breaking away of the crucible in order to restrike an arc.

Another object of the invention is the provision of a coated electrode wherein the coating has relatively large amounts of finely divided metal to be deposited in the weld seam which provides a slag which has a relatively high viscosity when molten and is substantially self-removing after it hardens.

Another object of the invention is the provision of a new and improved electrode coating of the general type referred to wherein the slag deposited on the top of the weld bead has characteristics whereby it will be self-removing as the deposited weld bead cools to room temperature.

Still another object of the invention is the provision of a coated electrode of the type wherein at least a portion of the deposited weld metal will come from the coating itself which enables the depositing of extremely high-quality weld beads in a minimum time period.

Another object is the provision of an electrode of the type described having a sufficiently high melt-off rate and with a coating having a melting point high enough so as to confine the arc and prevent arc blow whereby the electrode may readily be used with a D. C. power source.

In accordance with the present invention, an arc-welding electrode is provided comprised of a central core wire and a surrounding coating in thicknesses and containing metallic powder and slag-forming materials in ratios such that the weight of the slag-forming material equals approximately 25 percent of the total weight of the metal in the electrode. This coating is comprised generally of hte following ingredients in parts by weight:

| | |
|---|---|
| Iron powder | 30–60 |
| TiO$_2$ | 15–25 |
| Silica or insoluble silicates | 5–12 |
| Ferroalloys | 5–12 |
| Slip agents | Less than 4 |
| Organics before baking | 3 |
| After baking | Trace |
| Binders before baking | 10–20 |
| After baking | 7–12 |

The iron is generally in the form of a finely ground powder able to pass through from 20 to 100 mesh and may be reduced to this degree of fineness by any known disintegration process or by manufacturing initially as an iron powder. In some instances, the iron powder may be at least in part substituted for by an iron oxide in a powder form plus a reducing agent which will reduce the iron oxide to iron in the heat of the welding arc.

The $TiO_2$ employed is conventional rutile ground to a relatively fine size.

The insoluble silicates may be selected from any of the large number of known silicates but, generally, will include the aluminum silicates such as kaolin and/or mica which are known to have the general formulation $Al_2O_3SiO_2$. Alternatively, $SiO_2$ can be employed. It will be noted that the silicates mentioned may be generally referred to as acid silicates as the term is normally employed in steel making. $SiO_2$ is normally considered to be quite acid while aluminum oxide is considered to be relatively neutral but, when combined with the $SiO_2$, results in an essentially acid slag-forming ingredient.

The slip agents may include such materials as bentonite, talc and the various clays. They are employed to assist in the extrusion of a coating onto the core wire and are held to a bare minimum or not used at all because they tend to interfere with one of the desired characteristics of the electrode to the present invention; namely, a coating which, although initially electrically nonconductive when fused and cooled, becomes and remains electrically conductive. Normally, these materials can be held to the bare minimum if small amounts of organic materials are employed in the coating. However, such organics are considered undesirable to the ultimate welding rod and, thus, should be of a type which will disintegrate from the coating when it is baked after applying to the core wire. Obviously, all organic material could be employed as a slip agent but, as the cost is higher than the other material just referred to and some amount of talc or bentonite has been found not to be detrimental, a combination of organics and other slip agents is much cheaper to produce. In some respects, mica may be substituted for the other slip agents referred to, although, in some respects, the mica then performs the dual function of being a slip agent and an acid-forming flux ingredient.

The ferroalloys may be as desired including ferromanganese and ferrosilicon. The binder may be $NaSiO_3$ or $KSiO_4$ which are soluble silicates and may, thus, be distinguished from the insoluble silicates referred to above.

Preferred embodiments of the coating which have been found to carry out the objectives of the invention are as follows in parts by weight:

|  | As Extruded | After Baking |
|---|---|---|
| Formula A: |  |  |
| Iron Powder | 40 | 45.6 |
| $TiO_2$ | 20 | 22.8 |
| Kaolin | 4 | 4.6 |
| Mica | 5 | 5.7 |
| Gum Cellulose | 1.5 | Trace |
| FeMn | 9 | 10.3 |
| $NaSiO_3$ (57% $H_2O$) | 9.5 | 4.7 |
| $KSiO_3$ (61% $H_2O$) | 9.5 | 4.2 |
| Formula B: |  |  |
| Iron Powder | 40 | 44.8 |
| $TiO_2$ | 21 | 23.8 |
| $SiO_2$ | 8 | 9.0 |
| Talc | 3 | 3.4 |
| Sodium Alginate, Wet | 2 | Trace |
| FeMn (low carbon) | 7 | 7.8 |
| FeSi | 3 | 3.4 |
| $NaSiO_3$ | 8 | 3.8 |
| $KSiO_3$ | 8 | 3.5 |
| Formula C: |  |  |
| Iron Powder | 44 |  |
| $TiO_2$ | 22 |  |
| $SiO_2$ | 7.7 |  |
| Gum Cellulose | Trace |  |
| Talc | 3.3 |  |
| Ferromanganese | 7.7 |  |
| Ferrosilicon | 3.3 |  |
| Binder | 8.0 |  |

The ingredients of these formulae are finely ground so as to pass through a 40 mesh screen. They are then thoroughly mixed to a paste-like consistency and are extruded onto the core wire in amounts such that the slag-forming materials approximate 25 percent of the weight of the electrode. With the proportions stated, the coating generally equals 50 percent of the final weight of the electrode in a manner as is known in the art.

After extruding the coating onto the core wire, the ends are cleaned as is conventional and the core wire with the coating thereon is then thoroughly baked at temperatures of from 300 to 500 degrees F. for a time period sufficient to disintegrate the organic material and to drive off any moisture in the ingredients such as that, for example, contained in the silicate binders.

It is important that the proportions generally stated in the formulations be maintained. It has been found from extensive experimentation that if the amount of iron is increased beyond that stated, then there is not sufficient slag-forming materials in the coating to properly protect the deposited weld bead. Inferior welds result such as inferior bead shapes. Such slag-forming materials may be considered those other than the iron powder. Any decrease in the amount of iron results in excessive slag which is wasteful of expensive ingredients.

Also, using the ingredients as above indicated, the burn-off rate and melting temperature of the coating have been found to be substantially higher than heretofore such that a high temperature gradient will exist through the walls of the crucible to the outer surface of the coating and there will be less tendency for the crucible walls to burn through. Thus, the walls of the crucible can continuously confine the arc and can thereby prevent arc blow which, as is known, is a very undesirable feature of arc welding. In fact, using the present invention, quite satisfactory welding with almost no arc blow can be obtained using conventional D. C. arc welding power sources. With other coatings of a similar type, alternating-current power sources had to be used almost exclusively.

Higher amounts of iron powder than that indicated have been found to give undesirable bead shapes primarily in that an overhanging bead results. Further, as the amount of iron powder is increased, the amount of ferroalloys must also be proportionately increased and these are always relatively high priced from the standpoint of a weld-rod coating.

The formulations provide a slag which has a relatively high viscosity. Thus, there is little tendency for the molten slag to run down into the arc pool and interfere with the depositing of the molten metal, as well as interfere with the vision of the welding operator in determining the condition of the weld as he deposits the metal.

Another characteristic of the formulation above stated is that the slag is quite acid and has the characteristic of removing so easily as to almost be selfremoving. It forms a glassy, substantially solid slag which does not cling to the metal. Also, it has been found that the coefficient of expansion of the slag is practically zero as it cools from the solid state to room temperature. The deposited metal below, however, shrinks substantially and, in so doing, forces the slag away from the weld bead. The slag comes off in large pieces and that which remains is easily cleaned with a wire brush or hammer.

In this respect, it is to be noted that the formulations contain substantially no basic slag-forming ingredients; such as, calcium carbonate or iron oxide. The elimination of these coating ingredients which are normally found in coatings of this type has thus helped with the slag removal and, in addition, has provided a second very desirable feature in that the slag is electrically conductive. It has been found that very small amounts of these ingredients will eliminate this conductivity. This feature of conductivity of the slag is particularly of importance in the restriking of the arc. During the course of a welding operation, a conically shaped crucible is formed on the end of the electrode with the end of the core wire at the apex of this crucible. When the welding operation is stopped, it has been found that the crucible, together with the end of the core wire, is covered with a relatively thin layer of hardened fused slag. This slag is conductive. Thus, it is only necessary to again touch the end of the electrode to the workpiece in order to restrike the arc. The fused layer of slag on the surface of the crucible being conductive allows enough current flow to restrike the arc.

The coating of the above formulation and in accordance with the invention is electrically nonconductive. By electrically nonconductive is meant a coating which, when used in thicknesses normally employed with this type of electrode, has a sufficiently high electrical resistance that the current flow through the coating to the core is insufficient to spark or strike an arc if the coating is rubbed, pressed or laid on a metallic surface energized with a voltage relative to the core wire equal to or less than the normal open-circuit voltages used in arc welding; that is, something less than 100 volts.

By an electrically conductive slag is meant just the converse; namely, a slag which at low or room temperatures has an electrical resistance low enough such that when the fused electrode end is touched to the workpiece, the resultant current flow therethrough to the core wire is sufficient to strike the arc.

All substances, even those termed electrical insulators, have some electrical conductivity even though it be extremely small but, for the purposes of this invention, a coating having a resistance at room temperature in excess of 500,000 ohms measured from the core wire to a probe rubbed or pressed on the outer surface of the coating has been found to be satisfactory. Such resistances were measured on rods which have been exposed to normal humidity. The same rod, when heated in an oven to 250 degrees for a period of five minutes and cooled to room temperature, showed resistances from 2 to 10 megohms. A resistance of 50,000 ohms is considered to be unsatisfactory.

On the other hand, a coating which, upon fusion and cooling produces a slag having a resistance of from 5 to 10,000 ohms measured from the walls of the crater to the core wire, has been found to be satisfactory to enable the restriking above referred to.

It is to be emphasized that this high conductivity must continue even after the fused coating is cooled to normal room temperatures. Almost all nonmetallic materials become conductive when heated to a red temperature or above. Normally, this conductivity again goes down when the material is cooled. With the present electrode coating, the conductivity does drop somewhat but not as far as heretofore known.

Electrodes constructed in accordance with the present invention have proven extremely satisfactory in practice and an extremely high rate of metal deposition is a characteristic of the present electrode. In fact, the rate of metal deposition is so high that the labor cost of laying a weld bead is reduced so much that in some cases it has been found economical to scrap existing electrodes and use electrodes constructed in accordance with the present invention even though the initial cost of the electrode is higher than those scrapped.

Figure 2:
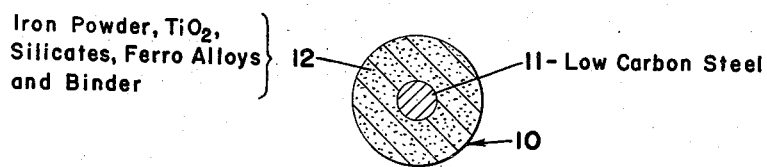

The accompanying drawing illustrates one physical form which the present invention may take, thus Figure 1 shows a side elevational view partly in cross-section of a welding electrode constructed in accordance with the present invention and Figure 2 is a cross-sectional view of Figure 1 taken in approximately in the line 1—1 thereof.

In the drawings, an electrode shown generally at 10 is comprised of a central core member 11 which may be of ordinary low carbon steel wire. Surrounding this wire is a coating 12 of a composition and of the relative weights all above described. This coating 12 terminates short of one end of the core 11 as at 13 so that electrical contact can be made of the core 11 by means of conventional electrode holders.

The invention has been described in connection with preferred embodiments. Obviously, alterations and variations will occur to others upon a reading and understanding of this specification and it is my intention to include such modifications and alterations insofar as they come within the scope of the appended claims. For example, another formulation in parts by weight which has proven satisfactory for some types of welding, although not having the restriking characteristics discussed above, is as follows:

| | |
|---|---|
| Iron powder | 42 |
| Iron oxide | 10 |
| Rutile (TiO$_2$) | 5 |
| Ferromanganese | 10 |
| Ferrosilicon | 1 |
| Quartz | 13 |
| Calcium carbonate | 9 |
| Gum cellulose less than | 2 |
| Sodium silicate | 4 |
| Potassium silicate | 4 |

Having thus described my invention, I claim:

1. A coated welding electrode comprised of a metallic core and a coating, said coating consisting of the following principal ingredients after baking:

| | Percent |
|---|---|
| Iron powder | 30–60 |
| TiO$_2$ | 15–25 |
| Silicates and silicate forming materials (nonsoluble) | 5–12 |
| Ferro alloys | 5–12 |
| Organics | Trace |
| Binder | 1 to 4 |
| | 7–15 |

2. The combination of claim 1 wherein the weight of the coating is so proportioned that the ingredients other than the iron powder ferroalloys equal approximately twenty-five percent of the total weight of the electrode.

3. A welding electrode comprised of a metallic core and a surrounding coating, said coating consisting of the following ingredients; namely, in parts by weight:

| | |
|---|---|
| Iron powder | 44 |
| TiO$_2$ | 22 |
| SiO$_2$ | 7.7 |
| Talc | 3.3 |
| Ferromanganese | 7.7 |
| Ferrosilicon | 3.3 |
| Binder | 8 |

4. The combination of claim 3 wherein the weight of the coating equals approximately the weight of the metallic core.

5. A coated arc-welding electrode comprised of a metallic core and a surrounding coating of a weight approximately equal to the weight of said core, said coating consisting essentially of the following principal ingredients iron powder in amounts from 30 to 60 percent, TiO$_2$ from 15 to 25 percent and ferro alloys of from 5 to 12 percent and having no calcium carbonate.

6. A coated welding electrode comprised of a metallic core and a coating therearound, said coating consisting essentially of iron powder in amounts from 30 to 60 percent, titanium oxide in amount from 15 to 25 percent, aluminum silicates from 5 to 12 percent, slip agents in amounts from ½ to 4 percent, ferro alloys in amounts from 5 to 12 percent and containing no calcium carbonate.

7. A welding electrode comprised of a metallic steel wire core and a surrounding coating having a total weight equal approximately to the weight of the core wire, said coating consisting of the following ingredients in the approximate named proportions:

| Ingredient | Parts by weight |
|---|---|
| Iron powder | 40 |
| TiO$_2$ | 20 |
| Kaolin | 4 |
| Mica | 5 |
| Gum cellulose | 1.5 |
| FeMn | 9 |
| NaSiO$_3$ | 9.5 |
| KSiO$_3$ | 9.5 |

8. A welding electrode comprised of a metallic steel wire core and a surrounding coating having a total weight equal approximately to the weight of the core wire, said coating consisting of the following ingredients in the approximate named proportions:

| Ingredient | Parts by weight |
|---|---|
| Iron powder | 40 |
| TiO$_2$ | 21 |
| SiO$_2$ | 8 |
| Talc | 3 |
| Sodium alginate | 1 |
| FeMn | 7 |
| FeSi | 3 |
| NaSiO$_3$ | 8 |
| KSiO$_3$ | 8 |

9. A welding electrode comprised of a metallic core and a surrounding coating in a weight approximately equal to the weight of the core, said coating consisting of the following principal ingredients, namely in approximate parts by weight:

| Ingredient | Parts by weight |
|---|---|
| Iron powder | 44 |
| TiO$_2$ | 22 |
| SiO$_2$ | 7.7 |
| Talc | 3.3 |
| Ferromanganese | 7.7 |
| Ferrosilicon | 3.3 |
| Binder | 8.0 |

10. A welding electrode comprised of a metallic core and a surrounding coating having a weight approximately equal to the weight of said core, said coating consisting of the following principal ingredients, namely in approximate parts by weight:

| Ingredient | Parts by weight |
|---|---|
| Iron powder | 44 |
| TiO$_2$ | 22 |
| SiO$_2$ and/or Al$_2$O$_3$ | 7.7 |
| Talc and/or clay | 3.3 |
| Ferromanganese and/or ferrosilicon | 11.0 |
| Binder | 8 |

11. A welding electrode comprised of a metallic core and a surrounding coating of a weight approximately equal to the weight of the core, said coating consisting of the following principal ingredients, namely in approximate parts by weight: Iron powder 44, TiO$_2$ 22, acid slag forming ingredients selected from the class consisting of SiO$_2$, Al$_2$O$_3$, and Al$_2$O$_3$:SiO$_2$ 7.7, slip agents selected from the class consisting of clay and talc 3.3, ferro alloys selected from the class consisting of ferromanganese and ferrosilicon 11, and a binder selected from the class consisting of sodium silicate and potassium silicate 8.

References Cited in the file of this patent

UNITED STATES PATENTS

| Number | Name | Date |
|---|---|---|
| 1,329,530 | Kirkhead | Feb. 3, 1920 |
| 1,926,090 | Frickey | Sept. 12, 1933 |
| 1,977,278 | Judy | Oct. 16, 1934 |
| 2,000,861 | Miller | May 7, 1935 |
| 2,009,240 | Roberts | July 23, 1935 |
| 2,024,992 | Wissler | Dec. 17, 1935 |
| 2,165,022 | Anderson | July 4, 1939 |
| 2,291,482 | McLott | July 28, 1942 |
| 2,370,100 | White | Feb. 20, 1945 |
| 2,429,175 | Willigen | Oct. 14, 1947 |
| 2,451,655 | Bienfait | Oct. 19, 1948 |
| 2,544,334 | Linnert | Mar. 6, 1951 |
| 2,587,251 | Willigen | Feb. 26, 1952 |
| 2,730,465 | Van der Willigen | Jan. 10, 1956 |

FOREIGN PATENTS

| Number | Country | Date |
|---|---|---|
| 553,371 | Great Britain | May 19, 1943 |
| 573,598 | Great Britain | Nov. 28, 1945 |